United States Patent [19]

Aoki

[11] 3,949,963

[45] Apr. 13, 1976

[54] BOTTOM DRAIN VALVE CONSTRUCTION

[76] Inventor: Kaoru Aoki, No. 2249 Arima, Takatsu, Kawasaki, Kanagawa, Japan

[22] Filed: Nov. 7, 1974

[21] Appl. No.: 521,760

[30] Foreign Application Priority Data

Dec. 26, 1973   Japan.............................. 48-143924

[52] U.S. Cl. ................. 251/63.6; 251/144; 137/554
[51] Int. Cl.² ...................................... F16K 31/363
[58] Field of Search ................... 251/144, 63.5, 63.6

[56] References Cited
UNITED STATES PATENTS

| | | | |
|---|---|---|---|
| 3,052,444 | 9/1962 | Kintnel .......................... | 251/63.6 X |
| 3,390,943 | 7/1968 | Myers .............................. | 137/554 X |
| 3,417,960 | 12/1968 | Stehlin ........................... | 251/144 X |
| 3,838,707 | 10/1974 | Wachowitz, Jr. ................ | 251/63.5 X |

FOREIGN PATENTS OR APPLICATIONS 685,102   4/1964   Canada.............................. 251/144

*Primary Examiner*—William R. Cline
*Attorney, Agent, or Firm*—McGlew and Tuttle

[57] ABSTRACT

A bottom drain valve comprises a housing with an upper tubular portion with a top drain opening and an annular valve seat around the drain opening. The drain discharge connects laterally downwardly from the lower part of the upper tubular portion. A valve rod guide and sealing portion of the housing extends below and is aligned with the upper portion and has a valve rod guide bore therethrough. A lower cylindrical portion of the housing has a bottom wall with a piston passage bore and has a first drain chamber below the valve rod guide and sealing portion and a second piston chamber below the drain chamber. A piston guide chamber is defined between the first drain chamber and the second piston chamber. An actuating piston is movable in the second piston chamber and has a central hollow tubular portion which is guided in the piston guide chamber adjacent its upper end and guided through the piston bore adjacent its lower end and out of the lower cylindrical portion. The hollow tubular portion permits draining of the leakage liquid therethrough. A valve member including a rod portion extends through at least part of the hollow tubular portion of the piston and through the valve rod guide bore and the valve rod guide sealing portion. Removable pin means connects the lower end of the valve rod to the piston. The valve member has a valve head on the rod portion engageable on the valve seat to close the opening and it is movable with said rod portion upwardly off the valve seat to open the opening.

5 Claims, 3 Drawing Figures

BOTTOM DRAIN VALVE CONSTRUCTION

BACKGROUND OF THE INVENTION

Field of the Invention

This invention relates, in general, to the construction of valves and, in particular, to a new and useful drain valve having an operating piston passage for operating the valve which is located below a sealing chamber which drains through a central tubular part which extends downwardly through the piston chamber so that the liquid does not flow into the chamber.

DESCRIPTION OF THE PRIOR ART

The known bottom drain valves are formed by casting and these valves are subjected to the presence of leakage through pin holes which are formed in the casting. The polishing of the inside surface or liquid passages of the main body is inevitably attended with a difficulty caused by the molecular structure which is peculiar to castings. Any liquid which drains through the valves therefore stays in the bent portions or crevices of the assembly and, as a result, the quantity of liquid which flows down through the valve passage is decreased and the flow efficiency is conspicuously lowered. In addition, where a liquid of a different property is passed through the next time the liquid which is left behind during a previous operation contaminates this liquid and, in some instances, the passage of different liquids and the retention in the valve housing causes corrosion of the valve parts. In some instances, the liquid even penetrates into a cylindrical portion forming a housing of a dry piston for the valve. When such a piston and cylinder need to be cleaned, it is difficult to effect disassembly since it is both time-consuming and expensive.

In accordance with the present invention, there is provided a drain valve with a valve member which is seatable on an annular seat at the drain valve opening and which passes through a drain conduit through a sealing gland and a packing into a cylinder having a central drain conduit which extends through the drive piston and drains downwardly at the exterior of the piston cylinder. The bottom end of the valve rod is detachably coupled to a tubular piston by a fixing pin which permits easy disassociation of the two parts for the cleaning of the valve housing and the associated parts.

The construction also includes a combined sealing cylinder and operating piston cylinder or a double structure which insures that any leakage which arises in the sealing gland will be prevented from travelling along the valve rod and permeating into the operating cylinder.

In accordance with another feature of the invention, a loose flange is interposed between the main body of the valve and the bottom portion of a liquid storage tank.

Accordingly, it is an object of the invention to provide an improved drain valve which includes a valve rod guide sealing portion of the housing which extends below and is aligned with an upper tubular portion and which further includes a lower cylindrical portion defining an operating piston chamber in which a piston is movable and wherein the piston includes a tubular portion which passes through the piston cylinder and drains the intermediate cylinder of any leakage water.

A further object of the invention is to provide a bottom drain valve which is simple in design, rugged in construction and economical to manufacture.

BRIEF DESCRIPTION OF THE DRAWING

The drawing illustrates the preferred embodiments of this invention, in which.

DETAILED DESCRIPTION OF THE INVENTION

Figure 1:
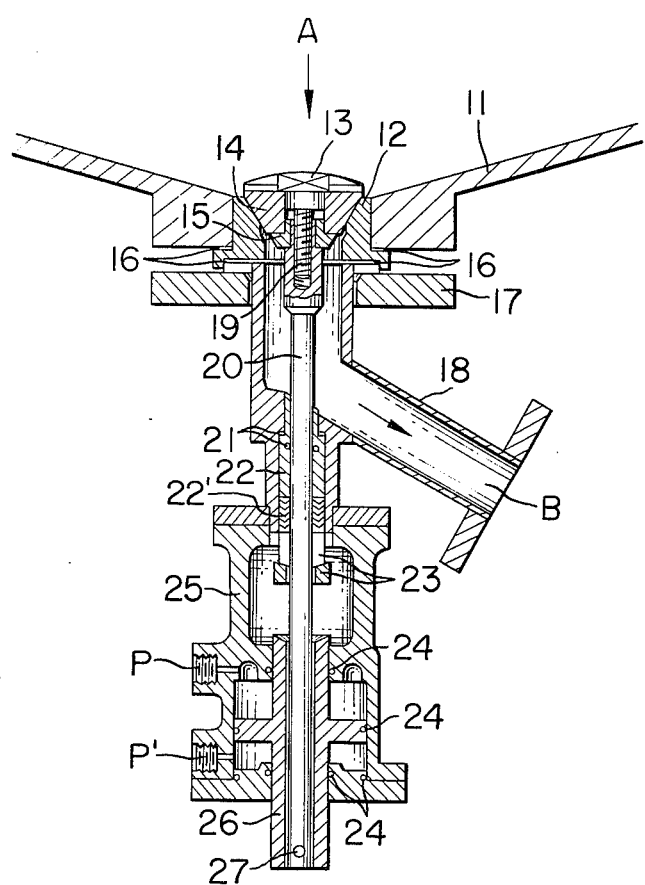
FIG. 1 is a vertical sectional view of an automatic bottom valve as the first embodiment.

The embodiment of the invention shown in FIG. 1 comprises the bottom drain valve for draining the bottom of a storage tank 11 having the drain valve situated in the lowest portion thereof. The drain valve includes a valve housing with an upper tubular portion having a central opening defined therein with an annular inwardly and downwardly sloping valve seat 12. The upper tubular portion includes a lateral and downwardly extending drain discharge portion 18 having a drain passage B.

The valve housing also includes a valve rod guide and sealing portion which includes a valve sleeve guide 22 and sealing means such as packing 21 and 22' defining a central bore therethrough for the passage of a valve rod portion 20 of valve member. The upper portion of the valve rod is connected through a taper pin to a valve body or head portion 14 having a side sealing surface which engages on the seat 12 and with an upper valve guide portion 13. When the valve head portion is raised upwardly upon upward movement of the valve rod liquid A in the tank drains out through the opening of the tank.

In accordance with a feature of the invention the valve housing also includes a lower cylindrical portion 25 which has a bottom wall with a bore through which a lower end of a hollow tubular central portion of a piston 26 extends. Piston 26 also includes a widened portion having packing seals engaged on the wall of a lower portion of the cylinder 25. The hollow tubular central portion of the cylinder 26 is also guided in a packing seal 24 defined between an upper or first drain chamber and a lower or second piston chamber in which the widened portion of the piston 26 is movable. A feature of the construction is that the valve rod portion of the valve member extends loosely through the hollow tubular portion of the piston 26 and it may be secured thereto such as by a removable fixing pin 27. Thus any leakage liquid may drain along the rod portion through the lower end of the upper tubular housing and the guide sleeve 22 and into the drain chamber or upper first chamber of the cylinder 25. Such liquid accumulates may also pass through the hollow piston 26 and outwardly beyond the lower end thereof.

Figure 2:
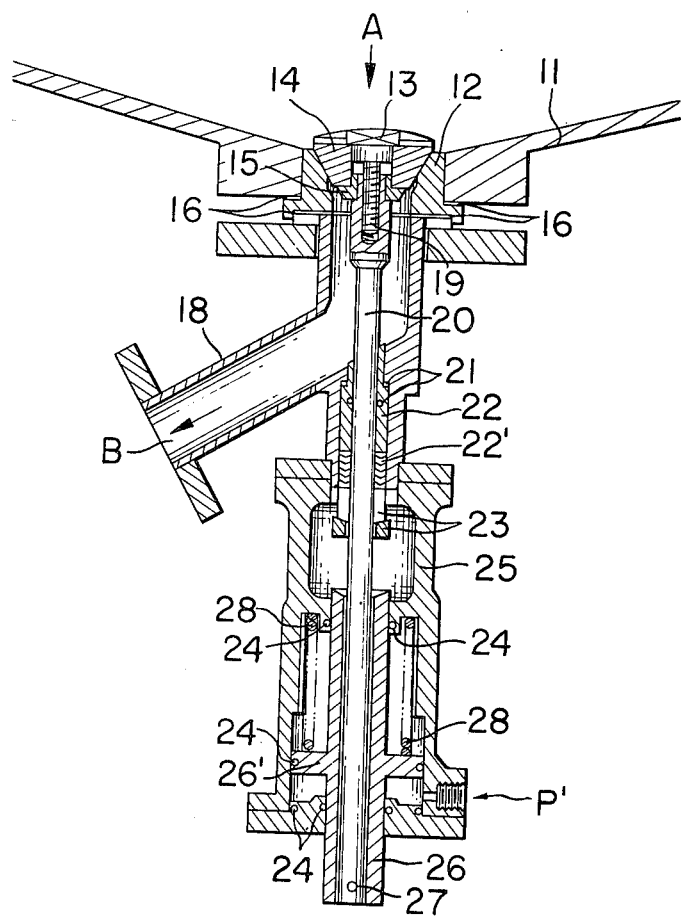
FIG. 2 is a vertical sectional view of an automatic bottom valve with a spring as the second embodiment.

The modification of the invention shown in FIG. 2 includes substantially identical parts which are similarly designated. The principal distinction in the embodiment however is that the second or lower portion of the cylinder 25 is vertically elongated to a greater extent and it includes a return spring 28 which acts on the widened portion of the piston 26' to return it to a closed position. In both embodiments the piston 26 is moved to an actuating position by applying fluid pressure through the fluid pressure line P'. In the first embodiment the piston is returned by withdrawing the pressure through the port P'. The port P from its venting of the cylinder space on the opposite side of the piston.

Figure 3:
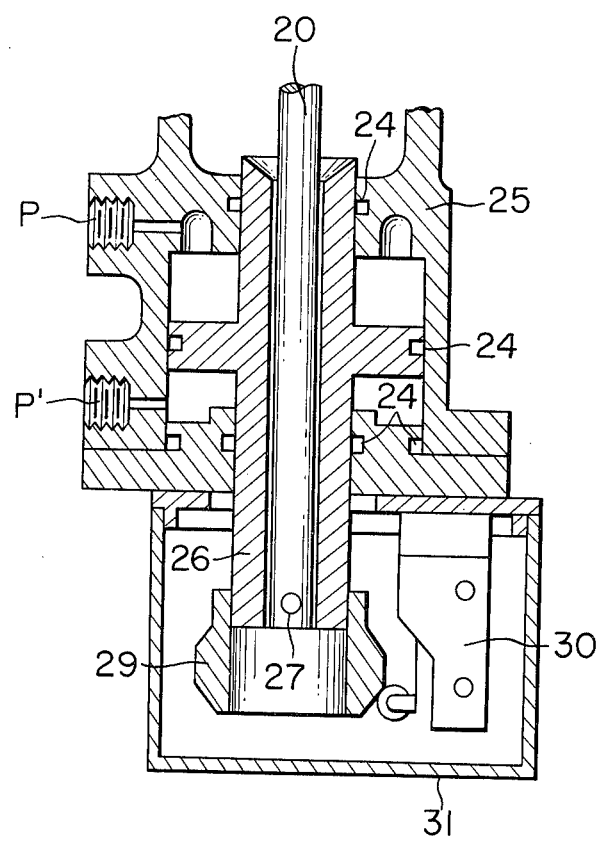
FIG. 3 is an enlarged front view of the lower part of the automatic bottom valve, showing the state in which a limit switch common to both the embodiments is mounted.

The valve member may be operated in conjunction with an indicating or control device which as shown in FIG. 3 includes a switch 30 having an actuating portion which forms a follower which is engageable by an extension or switch pusher 29 which is affixed to the lower end of the piston 26 such as by the same pin which also secures the rod portion 20 to the piston 26.

The essential features of this invention will now be explained in detail in connection with both the embodiments illustrated in the accompanying drawing.

I. First Embodiment (refer to FIG. 1)

A liquid storage tank 11 is filled with a liquid A. When compressed air is fed in from a control port P', a piston 26 starts and ascends. A valve guide 13, a valve body 14, a valve guard 15 and a taper pin 19 are integral with a valve rod 20, and the valve rod 20 is coupled to the piston 26 by a fixing pin 27. In that case, therefore, the valve body 14 ascends in interlocking with the piston 26. Upon the ascent of the valve body, the liquid A inside the storage tank 11 flows down towards a liquid passage B via a funnel-shaped interstice which is defined between the outer-peripheral grinding surface of the valve body 14 and the inner-peripheral grinding surface of a valve seat 12. The liquid passage B is polish-finished into a mirror surface, and the liquid A can pass therethrough very smoothly and swiftly without staying at its bent part and depressed part. Conversely, when the compressed air is fed in from a control port P, the piston 26 starts and descends. In this case, the valve rod 20 coupled to the piston 26 by the fixing pin 27 descends simultaneously with the piston 26 in interlocking therewith. As previously stated, the taper pin 19, the valve guard 15, the valve body 14 and the valve guide 13 which are integrally formed are directly coupled to the valve rod 20. Upon the descent of the piston 26, therefore, the valve body 14 also descends along with the piston. Since its outerperipheral grinding surface is closely laid on the inside grinding surface of the valve seat 12, the valve actuating portion is closed, and the flow of the liquid from the storage tank 11 to the passage B is stopped.

At one end of the valve rod 20, there are connected the integrally coupled valve guide 13, valve body 14, valve guard 15 and taper pin 19. The other end of the valve rod 20 is detachably coupled to the piston 26 by the fixing pin 27. In case of a routine cleaning or at the invasion of dust or any other foreign matter into the valve actuating portion, the coupling between the valve rod 20 and the piston 26 can be readily released merely by detaching the fixing pin 27. The troublesome job as in the prior-art valve of the same type that even the cylinder portion must be disassembled, is not required. It is therefore easy to perform the overhaul and cleaning of the valve actuating portion by pushing the valve rod 20 upwards.

A cylinder 25 is formed into a two-stage stack type. The control ports P and P' are provided outside the hollow portion of the lower stage. An upper opening of the hollow piston 26 and a packing gland 23 of a gland portion are separagely situated at the lower and upper parts of the hollow portion of the upper stage, respectively. The lower part of the valve rod 20 is snugly inserted into the hollow portion of the cylinder 25, and the piston 26 and the valve rod 20 are coupled by the fixing pin 27. Therefore, where liquid leakage arises in the gland portion, the leakage liquid travels along the valve rod 20. It flows down and is discharged via the interspace between the valve rod 20 and the inside surface of the hollow piston 26. It is not feared at all that the liquid will permeate and flow into the driving portion to hinder the function of the driving portion and to lower the driving efficiency.

In order to mount "the valve mechanism coupled integrally with a main body 18" on the bottom part of the liquid storage tank 11, a loose flange 17 is interposed. The location of the outlet side of the liquid passage (B) can therefore be freely made.

II. Second Embodiment (refer to FIG. 2)

This embodiment is similar to the first embodiment in the fundamental structure. Some important differences are as stated below. The lower stage of the cylinder 25 is formed to be longer in the vertical direction in comparison with the upper stage. A single control port P' is provided in order to feed and draw out the compressed air. A spring 28 is fittedly disposed in the hollow portion of the lower stage of the cylinder 25 in a manner to be placed on a piston plate 26'. As compared with the first embodiment, the second embodiment has these differences in the external appearance and the structure. They lead to differences in the operation and the effect.

The liquid storage tank 11 is filled with the liquid A. When the compressed air is fed in from the control port P', the piston 26 starts and it ascends while pressing the spring 28. The valve guide 13, the valve body 14, the valve guard 15 and the taper pin 19 are integral with the valve rod 20, and the valve rod 20 is coupled to the piston 26 by the fixing pin 27. In that case, therefore, the valve body 14 ascends in interlocking with the piston 26. In consequence, the liquid A inside the storage tank 11 flows down towards the liquid passage B, polish-finished into a mirror surface, via the funnellike interstice which is defined between the outer-peripheral grinding surface of the valve body 14 and the inside grinding surface of the valve seat 12. The liquid A can pass through the passage B very smoothly and swiftly without staying at its bent part and depressed part. Conversely, when the compressed air is exhausted from the control port P', the piston 26 starts and descends owing to the elastic force of the spring 28. In this case, the valve rod 20 coupled to the piston 26 by the fixing pin 27 is lowered in interlocking with the piston 26, so that an urgent measure is taken. More specifically, as previously described, the integrally formed taper pin 19, valve guard 15, valve body 14 and valve guide 13 are directly coupled to the valve rod 20. Therefore, if the piston 26 descends owing to the elastic force of the spring 28, the valve body 14 descends simultaneously. Since the outer-peripheral grinding surface of the valve body 14 is closely laid on the inside grinding surface of the valve seat 12, the valve actuating portion is closed. Thus, the flow of the stored liquid A from the storage tank 11 to the passage B is urgently cut off.

At one end of the valve rod 20 there are connected the integrally coupled valve guide 13, valve body 14, valve guard 15 and taper pin 19, while the other end of the valve rod 20 is detachably coupled to the piston 26 by the fixing pin 27. In case of a routine cleaning or a cleaning at the invasion of dust or any other foreign matter into the valve actuating portion, the cleaning can be easily carried out merely through the detachment of the fixing pin 14 without the necessity for disassembling even the cylinder portion as in the prior-art valve. This effect is remarkable especially in the present embodiment in which the spring is disposed in the cylinder portion. Because the disassembly of the cylinder in which the spring is inserted is inevitably attended with conspicuous danger. The cylinder 25 is formed into the two-stage stack type. The control port P' is provided at the lower part of the lower stage. The upper opening of the hollow piston 26 and the packing gland 23 of the gland portion are separately situated at the lower and upper parts of the hollow portion of the upper stage, respectively. The lower part of the valve rod 20 is snugly inserted into the hollow portion of the cylinder 25. The piston 26 and the valve rod 20 are coupled by the fixing pin 27. Therefore, even when liquid leakage occurs in the gland portion, the leakage liquid goes along the valve rod 20. Since it flows down and is discharged via the interspace between the valve rod 20 and the inside surface of the hollow piston 26, the hindrance of the function of the driving center is not feared. In addition, by interposing the loose flange for the coupling between the liquid storage tank 11 and the main body 18, the location of the outlet side of the liquid passage B can be freely made. These effects are the same as in the foregoing first embodiment.

As clearly understood from the above description, the performance of this invention makes it possible to very easily overcome the many difficulties which couldn't possibly be solved by the prior art. Lastly, a limit switch as an auxiliary device common to the first and second embodiments will be referred to. As shown in FIG. 3, a limit switch pusher 29 is coupled to the piston 26 by the fixing pin 27. Then, each time the piston 26 rises or lowers, the limit switch pusher 29 depresses a limit switch 30. In this way, signals indicative of the opening and closure of the valve mechanism are generated. When a transparent cover 31 is used for the limit switch, there is the effect that the opening or closure can be readily confirmed in the exterior. In the drawing, simbol 16 designates a seat packing, 21 and 24 O-rings, 22 a guide, and 22' a gland packing.

I claim:
1. A bottom drain valve construction, comprising a valve housing with an upper tubular portion having a top drain opening and an annular inwardly and downwardly sloping valve seat around the drain opening, a drain discharge connecting the lower part of said upper tubular portion and extending to one side thereof, a valve rod guide and sealing portion of said housing extending below and aligned with said upper tubular portion and having a valve rod guide bore therethrough, a lower cylindrical portion having a bottom wall with a piston passage bore and having a first drain chamber below said valve rod guide and sealing portion and a second piston chamber below said drain chamber and with a piston guide chamber defined between said first drain chamber and said second piston chamber, an actuating piston movable in said second piston chamber having a central hollow tubular portion which is guided in said piston guide chamber adjacent its upper end and guided through said piston bore adjacent its lower end and out of said lower cylindrical portion, said hollow tubular portion permitting draining of leakage liquid therethrough, a valve member including a rod portion extending through at least part of said hollow tubular portion of said piston and through said valve rod guide bore and said valve rod guide and sealing portion, removable pin means connecting the lower end of said valve rod portion to said piston, said valve member having a valve head on said rod portion engageable on said valve seat to close the opening and being movable with said rod portion upwardly off said valve seat to open said opening, and means for moving said piston to move said valve member to open and close the opening.

2. A bottom drain valve according to claim 1, wherein said means for moving said piston comprises a connection into said piston chamber for applying a fluid pressure to move said piston in said piston chamber.

3. A bottom drain valve according to claim 1, wherein said means for moving said piston to move said valve member comprises a spring in said piston chamber for moving said piston.

4. A bottom drain valve according to claim 3, wherein said means for moving said piston also includes a connection to the piston chamber for moving said piston in a direction against the force of said spring in one direction of movement of said valve, the spring moving said valve in the other direction.

5. A bottom drain valve according to claim 1, including a control switch having an actuator portion disposed in the path of movement of said valve member, and means on said valve member for contacting said actuating member to actuate said switch.

* * * * *